Dec. 1, 1953   F. A. ZAENKERT   2,660,755
STUFFER VALVE
Filed March 4, 1952   2 Sheets-Sheet 1
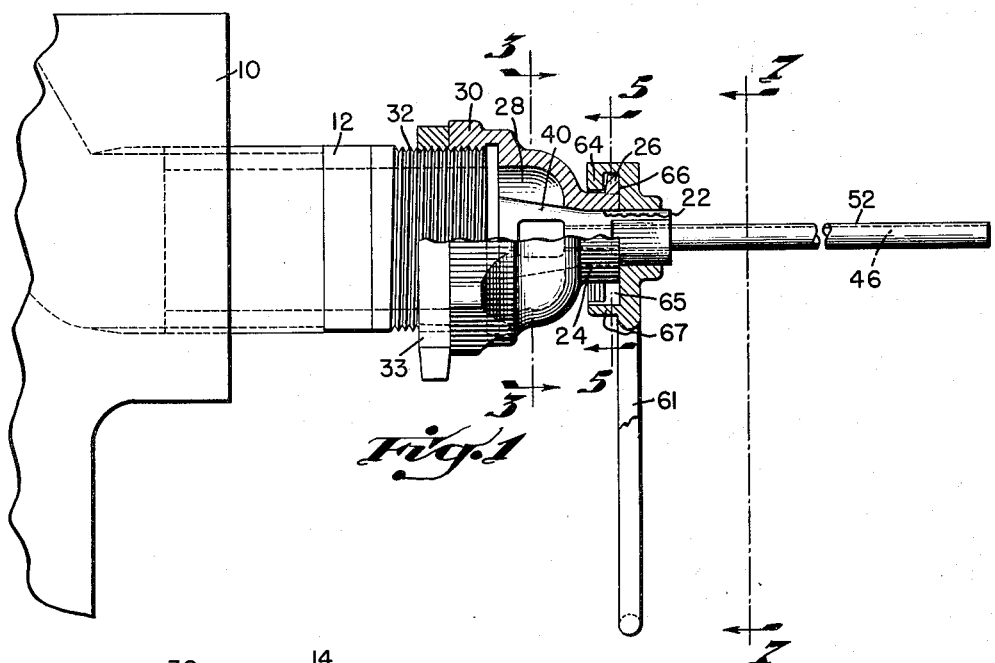
Fig. 1
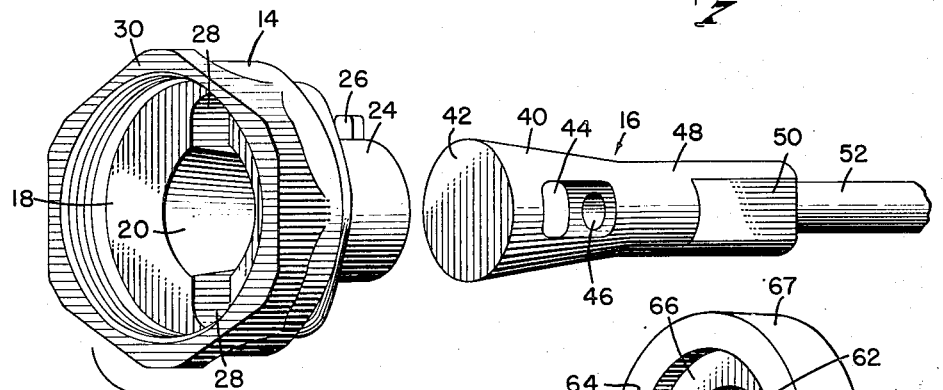
Fig. 2
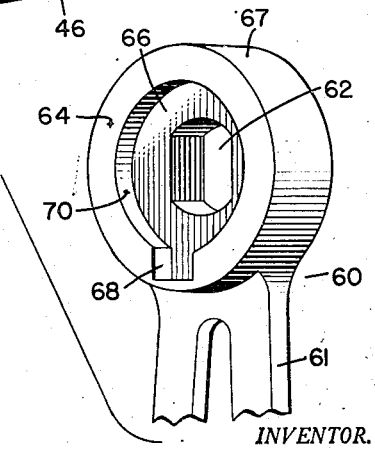
INVENTOR.
FREDERICK A. ZAENKERT
BY
*J. Warren Kinney, Jr.*
ATTORNEY Dec. 1, 1953 — F. A. ZAENKERT — 2,660,755
STUFFER VALVE
Filed March 4, 1952 — 2 Sheets-Sheet 2
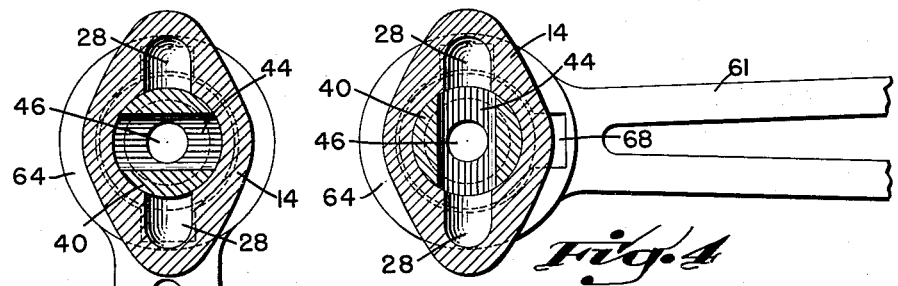
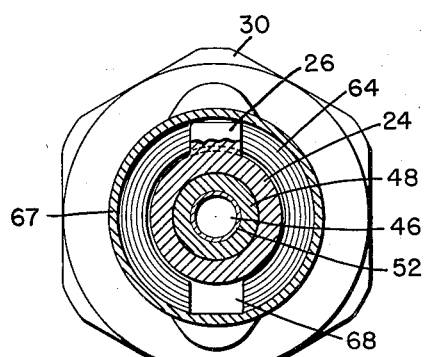
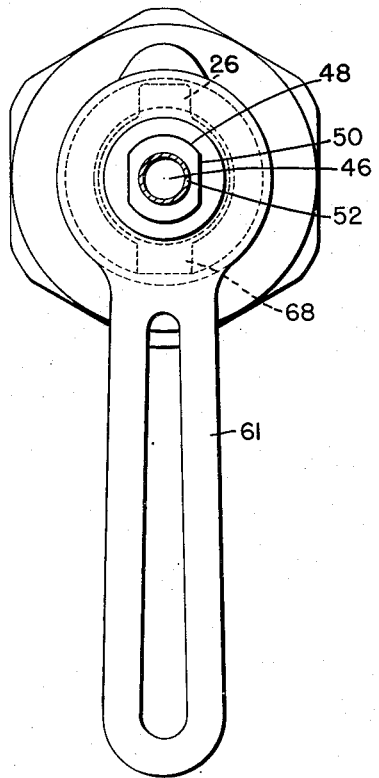
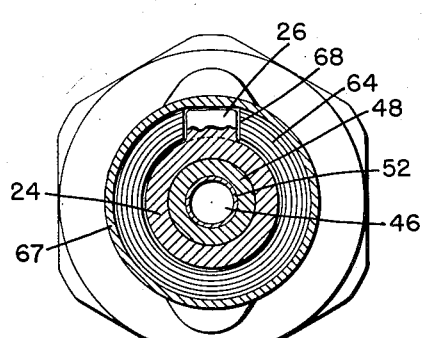
INVENTOR.
FREDERICK A. ZAENKERT
BY
ATTORNEY

Patented Dec. 1, 1953

2,660,755

UNITED STATES PATENT OFFICE 2,660,755

STUFFER VALVE

Frederick A. Zaenkert, Greenhills, Ohio, assignor to The Cincinnati Butchers' Supply Company, Cincinnati, Ohio, a corporation of Ohio Application March 4, 1952, Serial No. 274,700

8 Claims. (Cl. 17—41)

This invention relates to valves, and more particularly to a so-called stuffer valve for use in the meat-packing industry.

An object of the invention is to provide a stuffer valve which is characterized by its simplicity and efficiency.

Another object of the invention is to provide a stuffer valve which comprises but two elements which may be quickly and easily assembled and/or disassembled without requiring the use of special tools, thereby greatly enhancing its utility.

A further object of the invention is to provide a stuffer valve which includes a rotatable valve stem having a stuffer tube formed integral therewith.

Still another object of the invention is to provide a stuffer valve with a tapered self-seating, leak-proof valve plug assembly.

Another object of the invention is to provide a stuffer valve having the hereinabove described characteristics, which is constructed and arranged so that the pressure of the product being dispensed therethrough is utilized to seat the valve stem.

These and other objects are attained by the means described herein and as disclosed in the accompanying drawings, in which Fig. 1 is a side elevation, partly in section, of a stuffer valve embodying the teachings of the present invention.

Fig. 2 is an exploded view of the component parts of the valve of Fig. 1.

Fig. 3 is an enlarged sectional view on line 3—3 of Fig. 1.

Fig. 4 is a view similar to Fig. 3 with the valve stem moved counterclockwise by 90 degrees.

Fig. 5 is an enlarged sectional view on line 5—5 of Fig. 1.

Fig. 6 is a view similar to Fig. 5 but with the handle rotated through 180 degrees.

Fig. 7 is an enlarged sectional view on line 7—7 of Fig. 1.

With reference now to the drawings, the numeral 10 denotes a commercial sausage stuffer having a discharge pipe 12 through which the sausage product is expelled under pressure. The present invention is neither directed to nor concerned with the particular structural details of sausage stuffer 10, it being understood that such a device may be made, by way of example, in accordance with the disclosures of the E. F. Deacon U. S. Patent No. 1,444,064; the H. C. Ahrens Patent No. 1,470,371 or the H. L. Hunn Patent No 2,309,345.

The stuffer valve comprises a body portion 14 and a valve stem 16, wherein the valve body includes an inlet port 18, a conical seat 20 and an annular passageway 22, wherein the conical seat and annular passageway are disposed in substantial axial alignment with the inlet port 18.

A sleeve 24 projects from that end of the body portion remote from inlet port 18, said sleeve circumscribing annular passageway 22. In the preferred embodiment of the invention a lug 26 is secured to and carrier by the outer portion of the sleeve, for a reason hereinafter made more fully apparent.

A lateral port 28 diametrically spans conical seat 20, said port being in open communication with inlet port 18.

In the preferred embodiment of the invention the body portion, adjacent the inlet end, is provided with an internally threaded collar 30 adapted to engage threaded portion 32 of discharge pipe 12, and if desired a lock nut 33 may be provided, as illustrated.

Valve stem 16 includes a conical plug 40 the larger end of which terminates in a substantially continuous, flat surface 42 disposed at right angles with the longitudinal axis of the plug, note Fig. 2. A pair of ports are provided in plug 40, the first denoted by the numeral 44 extending radially of the plug between its opposite ends. The second port 46 is in open communication with the first port, said second port extending forwardly of and through that end of the plug remote from its larger end. The smaller end of conical plug 40 terminates in a cylindrical portion 48, the free outer end of which is provided with a pair of substantially parallel faces 50 which define a non-circular outer portion. A stuffer tube 52 is permanently secured to and comprises part of the valve stem, it being understood that port 46 extends axially through cylindrical portion 48 and throughout the entire length of stuffer tube 52.

The taper of plug 40 is complementary to the taper of valve seat 20 whereby larger end 42 of the plug will be disposed across and in spanning relationship with the larger end of the seat. The plug is adapted to be disposed in sealing relationship with the valve seat solely by reason of pressure exerted against its larger end 42 by the material introduced into inlet port 18 of the body portion from discharge pipe 12 of the stuffer.

A lever 60 having a non-circular opening 62 dimensioned to be received over the non-circular outer portion of the free outer end of cylindrical portion 48 of the valve stem is provided, said lever including a hand grip portion 61 and a circular flange portion 64 laterally separated from wall 66 by means of an annular channelway 65 in which lug 26 may be slidably received. A key-way 68 in flange 64 is provided for securing the handle onto the outer end of body portion 14 for disposing annular surface 70 defined by the inner face of flange 64 upon the outer face of sleeve 24.

Valve stem 16 may be rotated by means of handle 60 for disposing port 44 in or out of alignment with ports 28 of the body portion for thereby effectively controlling the passage of material into and through the stuffer tube.

From the foregoing it will be noted that the structural characteristics of the stuffer valve enable it to be quickly disassembled for thorough cleaning by merely unthreading the body portion from discharge pipe 12 of the stuffer. The valve stem may be disengaged from the body portion by urging it to the left, that is, toward the inlet port of the body portion. This may be done with handle 60 mounted upon the forward end of the body portion, or if desired, the handle portion may be first removed by rotating it for aligning lug 26 with key-way 68, whereupon the handle may be slid to the right, over stuffer tube 52.

It should be understood that various changes and modifications, in the structural details of the device, may be made, within the scope of the appended claims, without departing from the spirit of the invention.

What is claimed is:

1. A stuffer valve comprising a body portion having an inlet port and an axially aligned conical valve seat including a lateral port in open communication with the inlet port, a valve stem including a conical plug having a large and a small end and having a first port extending radially thereof and a second port disposed axially thereof and extending forwardly of and through that end of the plug remote from its larger end and in open communication with its first port, and means engaging the stem beyond the smaller end of the conical plug and journaled on said body portion for rotating said stem for moving its said first port into and out of communication with the lateral port of the valve seat.

2. A stuffer valve comprising a body portion having an inlet port and an axially aligned conical valve seat including a lateral port which diametrically spans and is in open communication with the inlet port, a valve stem including a conical plug having a large and a small end and having a first port entirely within the plug and extending diametrically therethrough, said plug including a second port disposed axially thereof and extending forwardly of and through that end of the plug remote from its larger end and in open communication with the first port, and means engaging the valve stem forwardly of the smaller end of the conical plug and journaled on said body portion for rotating said stem for moving its said first port into and out of communication with the lateral port of the valve seat.

3. A stuffer valve as defined in and by claim 2, wherein a stuffer tube is formed integral with the valve stem remote from said plug.

4. A stuffer valve comprising a body portion having an inlet port, a conical seat converging from said port and an axially aligned annular passageway beyond the smaller end of said seat, said conical seat having a transverse port in open communication with the inlet port, a valve stem including a conical plug the smaller end of which terminates in a cylindrical portion having a non-circular outer end from which a stuffer tube projects, the conical portion of said plug having a lateral port spaced from its larger end and an axial passageway in open communication with said lateral port and extending through the cylindrical portion and stuffer tube, said plug rotatably receivable within said seat with the cylindrical portion housed within and with its non-circular outer end projecting beyond the annular passageway of the body portion, means engaging the non-circular portion of the valve stem beyond the annular passageway for rotating said stem and stuffer tube relative to the body portion, and means integral with the body portion for detachably mounting the valve to and with its inlet port in open communication with the discharge pipe of a sausage stuffer.

5. A stuffer as defined in and by claim 4, wherein the body portion remote from the inlet port includes an annular sleeve circumscribing the annular passageway, and wherein the valve stem rotating means comprises a handle including a bearing surface dimensioned to loosely ride upon said sleeve, and a non-circular portion dimensioned to detachably engage the non-circular portion of the valve stem.

6. A stuffer valve as defined in and by claim 4, wherein the body portion remote from the inlet port includes an annular sleeve circumscribing the annular passageway, a lug on said sleeve adjacent its outer edge, and wherein the valve stem rotating means comprises a lever having a non-circular portion dimensioned to slide freely over the stuffer tube and engage the non-circular portion of the valve stem, a bearing surface dimensioned to ride upon the sleeve of the body portion, said bearing surface having a lug receptive slot therein, and an annular channel between the said non-circular portion and bearing surface dimensioned to receive said lug for precluding accidental or unintentional disassociation of the lever from the body portion of the valve.

7. A stuffer valve as defined in and by claim 1, wherein the larger end of the conical plug comprises a continuous, flat surface at substantial right angles with the longitudinal axis of the plug.

8. A stuffer valve as defined in and by claim 1, wherein that end of the valve stem remote from a conical plug projects forwardly of and in axial alignment with the smaller end of the conical valve seat of the body portion.

FREDERICK A. ZAENKERT.

References Cited in the file of this patent

UNITED STATES PATENTS

| Number | Name | Date |
|---|---|---|
| 103,773 | Pfleger | May 31, 1870 |
| 765,295 | Napier | July 19, 1904 |
| 1,616,868 | Rachford | Feb. 8, 1927 |
| 1,823,599 | George | Sept. 15, 1931 |
| 1,956,077 | Mojonnier | Apr. 24, 1934 |

OTHER REFERENCES

"Meat," September 1951, page 54.